(12) United States Patent
Ishino et al.

(10) Patent No.: US 8,191,704 B2
(45) Date of Patent: Jun. 5, 2012

(54) CONVEYING APPARATUS

(75) Inventors: Haruki Ishino, Kanazawa (JP); Satoshi Sakajiri, Kanazawa (JP); Ikuo Takashima, Kanazawa (JP); Eiji Nakayama, Kanazawa (JP); Yasuhiro Tokuda, Kanazawa (JP); Tetsuji Kitamura, Kanazawa (JP)

(73) Assignee: Ishino Seisakusyo Co., Ltd., Kanazawa-shi, Ishikawa (JP)

( * ) Notice: Subject to any disclaimer, the term of this patent is extended or adjusted under 35 U.S.C. 154(b) by 245 days.

(21) Appl. No.: 12/449,280

(22) PCT Filed: Apr. 21, 2008

(86) PCT No.: PCT/JP2008/057658
§ 371 (c)(1),
(2), (4) Date: Nov. 9, 2009

(87) PCT Pub. No.: WO2009/004854
PCT Pub. Date: Jan. 8, 2009

(65) Prior Publication Data
US 2010/0140057 A1 Jun. 10, 2010

(30) Foreign Application Priority Data
Jul. 2, 2007 (JP) ................................. 2007-174209

(51) Int. Cl.
*B65G 15/02* (2006.01)
(52) U.S. Cl. ..................................... 198/831; 198/860.1
(58) Field of Classification Search .................. 198/831, 198/860.1, 861.1
See application file for complete search history.

(56) References Cited

U.S. PATENT DOCUMENTS

| | | | | |
|---|---|---|---|---|
| 4,216,845 A | * | 8/1980 | Tashman et al. | 198/831 |
| 4,349,086 A | * | 9/1982 | Yamada | 186/49 |
| 5,477,778 A | * | 12/1995 | Kuwahara | 99/483 |
| 6,260,694 B1 | * | 7/2001 | Sasahara | 198/860.4 |
| 7,090,069 B2 | * | 8/2006 | Kawasaki | 198/494 |
| 2004/0206607 A1 | * | 10/2004 | Kawasaki | 198/831 |
| 2005/0189202 A1 | * | 9/2005 | Kawasaki | 198/840 |
| 2008/0179169 A1 | * | 7/2008 | Ishino et al. | 198/860.3 |

FOREIGN PATENT DOCUMENTS

| | | |
|---|---|---|
| JP | 55-045899 U | 3/1980 |
| JP | 60-241410 A | 11/1985 |
| JP | 2001-054458 A | 2/2001 |
| JP | 2001-252173 A | 9/2001 |
| JP | 2004-016464 A | 1/2004 |
| JP | 2004-187922 A | 7/2004 |

* cited by examiner

*Primary Examiner* — James R Bidwell
(74) *Attorney, Agent, or Firm* — Chapman and Cutler LLP

(57) ABSTRACT

A conveyance device uses a simple structure to cause a travel body on which food and drink are placed to travel stably. The conveyance device (10) causes the travel body (11) to travel and convey the food and drink that can be placed on the travel body (11). The conveyance device (10) has a conveyance drive section (13) provided along a travel path (12) on which the travel body (11) travels and also has a travel body connection section (14) connected to the travel body (11) and moving in the direction of travel of the travel body (11) by being driven by the conveyance drive section (13). The conveyance drive section (13) is placed on a side of the travel path (12).

15 Claims, 7 Drawing Sheets

CONVEYING APPARATUS

TECHNICAL FIELD

The present invention relates to a conveying apparatus for conveying food and drink, such as sushi, by running trays on which the food and drink are placed.

BACKGROUND ART

Crescent chain conveyors where a great number of studs in approximately half-moon shape in a plan view are attached to a chain, which is a conveying means that continuously moves so as to be relatively rotatable, are generally known as conventional conveying apparatuses for conveying dishes on which food and drink are placed in eating establishments, such as conveyor-belt sushi restaurants.

Meanwhile, in recent years some conveying apparatuses convey food and drink without using a crescent chain conveyor, for example, by providing trays on which food and drink are placed that can run on a conveying path via wheels and magnets at predetermined intervals beneath the conveying path which can run continuously by means of an endless drive chain so that the attracting force between the magnetic bodies provided on the above described trays and the magnets on the drive chain allows the trays to run (see, for example, Patent Document 1).

Patent Document 1: Japanese Unexamined Patent Publication 2004-16464 (page 1, FIG. 1)

DISCLOSURE OF THE INVENTION

Problem to Be Solved by the Invention

In the conveying apparatus described in the above Patent Document 1, however, the drive chain for running trays is provided beneath the conveying path, and thus, it becomes necessary to use magnetic force or the like in order to transmit the driving force of the drive chain to the trays via the conveying path, and therefore, such a problem arises that the transmitting mechanism becomes complicated and the manufacturing cost increases.

In addition, it is also possible to link the drive chain and the trays by means of linking members or the like. In such a case, however, it becomes necessary to provide a trench through which the linking members pass in the conveying path, which makes the outward appearance poor.

The present invention is provided in order to solve these problems, and an object of the invention is to provide a conveying device having a simple structure that can stably run a running body on which food and drink are placed.

Means for Solving Problem

In order to solve the above described problems, the conveying apparatus according to the present invention is a conveying apparatus for conveying food and drink by running a running body on which food and drink can be placed, having:

a conveyor driving portion provided along a running path along which the above described running body runs; and a running body linking portion which is linked to the above described running body and moves in the direction in which the above described running body runs when driven by the above described conveyor driving portion, and is characterized in that the above described conveyor driving portion is provided to a side of the above described running path.

As a result of these characteristics, the running body runs when the conveyor driving portion is driven and the running body linking portion is moved, and at the same time, no running surface is provided between the running body and the conveyor driving portion, and therefore, the running body can be linked to the conveyor driving portion without fail via the running body linking portion, and thus, the running body can be stably run.

Here, the running path along which the above described running body runs is not limited to an entity having a running surface for allowing a running body to run, but includes a running space without a running surface.

The conveying apparatus according to another aspect of the present invention is the conveying apparatus described above further characterized in that the above described conveyor driving portion is provided on the side opposite to the side from which food and drink placed on the above described running body are taken off.

As a result of these characteristics, the conveyor driving portion does not become an obstacle when food and drink are taken off, and in addition, safety increases.

The conveying apparatus according to another aspect of the invention is the conveying apparatus described above, further characterized in that the above described running body is supported approximately horizontally by the above described conveyor driving portion via the above described running body linking portion.

As a result of these characteristics, the load of the running body is supported by the conveyor driving portion via the running body linking portion, and thus, it becomes unnecessary to provide a running surface on which the running body runs to the running path, and therefore, the structure of the running path is simplified.

The conveying apparatus according to another aspect of the invention is the conveying apparatus described above, further characterized in that the above described conveyor driving portion is formed of: a driving rotational body which rotates by means of a drive source; a following rotational body provided separately from the driving rotational body; a driving part that includes an annular member which crosses the above described driving rotational body and the above described following rotational body and to which the above described running body linking portion is attached; and a casing member to which the driving part is integrally connected.

As a result of these characteristics, drive portions can be respectively connected to a case member in each unit, and therefore, the conveyor driving portion can be easily provided to a side of the running path.

The conveying apparatus according to another aspect of the invention is the conveying apparatus described above, further having: a circular food and drink conveying apparatus for supplying food and drink to customers by continuously conveying an endless circular conveying path and is characterized in that the above described running path is located above the above described circular conveying path.

As a result of these characteristics, food and drink can be efficiently conveyed using both the circular conveying apparatus and the conveying apparatus, and in addition, the circular conveying path and the conveying path can be provided in the space efficiently.

The conveying apparatus according to another aspect of the invention is the conveying apparatus described above, further characterized in that an entrance prohibiting means for prohibiting entrance into the above described running path on the side from which food and drink placed on the above described running body are taken off in the above described running path.

As a result of these characteristics, such a risk as to make contact with a running body running along the running path can be avoided.

The conveying apparatus according to another aspect of the invention is the conveying apparatus described above, further characterized in that the above described entrance prohibiting means is a support rail for supporting a side of the above described running body which extends in the longitudinal direction of the above described running path.

As a result of these characteristics, such a risk as to make contact with a running body running along the running path can be avoided by using a support rail for stabilizing the running body while being run.

The conveying apparatus according to another aspect of the invention is the conveying apparatus described above, further characterized by comprising a reporting means for reporting the running state of the above described running body.

As a result of these characteristics, whether a running body is running or not is reported, and thus, such a risk as to make contact with a running body running along the running path can be avoided.

EXPLANATION OF SYMBOLS

- 2 kitchen area
- 3 customers area
- 4 circular food and drink conveying apparatus
- 5 crescent chain conveyor (circular conveying path)
- 9 customer seats
- 10 ordered food and drink conveying apparatus (conveying apparatus)
- 11 conveying tray (tray)
- 12 running path
- 13 drive unit (conveyor driving portion)
- 14 linking member (linking portion)
- 15 conveyor belt (conveyor driving portion)
- 16 casing member (conveyor driving portion)
- 22 bracket
- 31 auxiliary roller
- 32 auxiliary rail (entrance prohibiting means)
- 40 to 42 guide rollers
- 50 reporting lamp (reporting means)
- 51 opening and closing bar (entrance prohibiting means)

BEST MODE FOR CARRYING OUT THE INVENTION

The best mode for carrying out the present invention is described below on the basis of the carrying apparatuses according to the embodiments.

EMBODIMENTS

Figure 1:
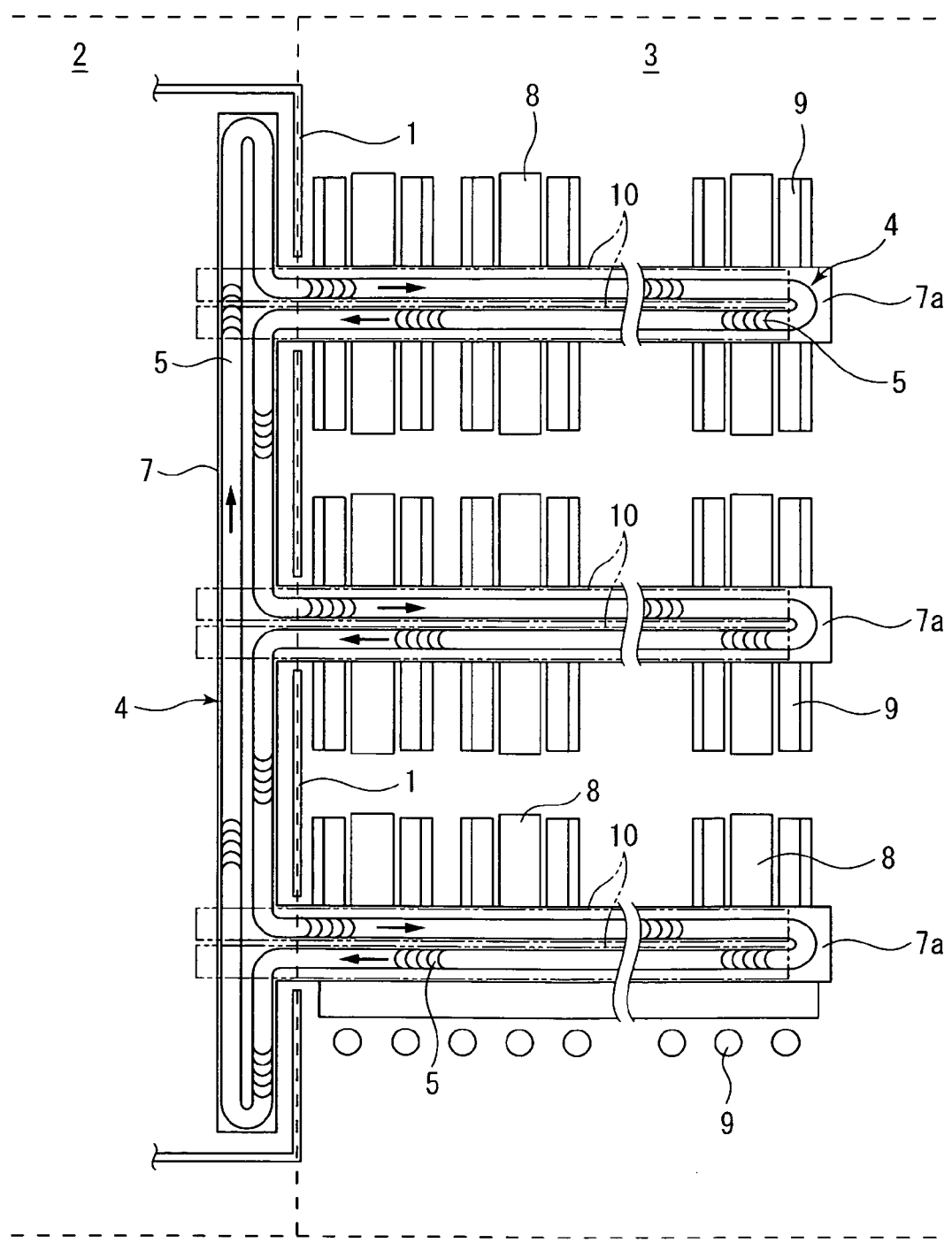
FIG. 1 is a plan diagram showing the circular food and drink conveying apparatus according to the present invention.
Figure 2:
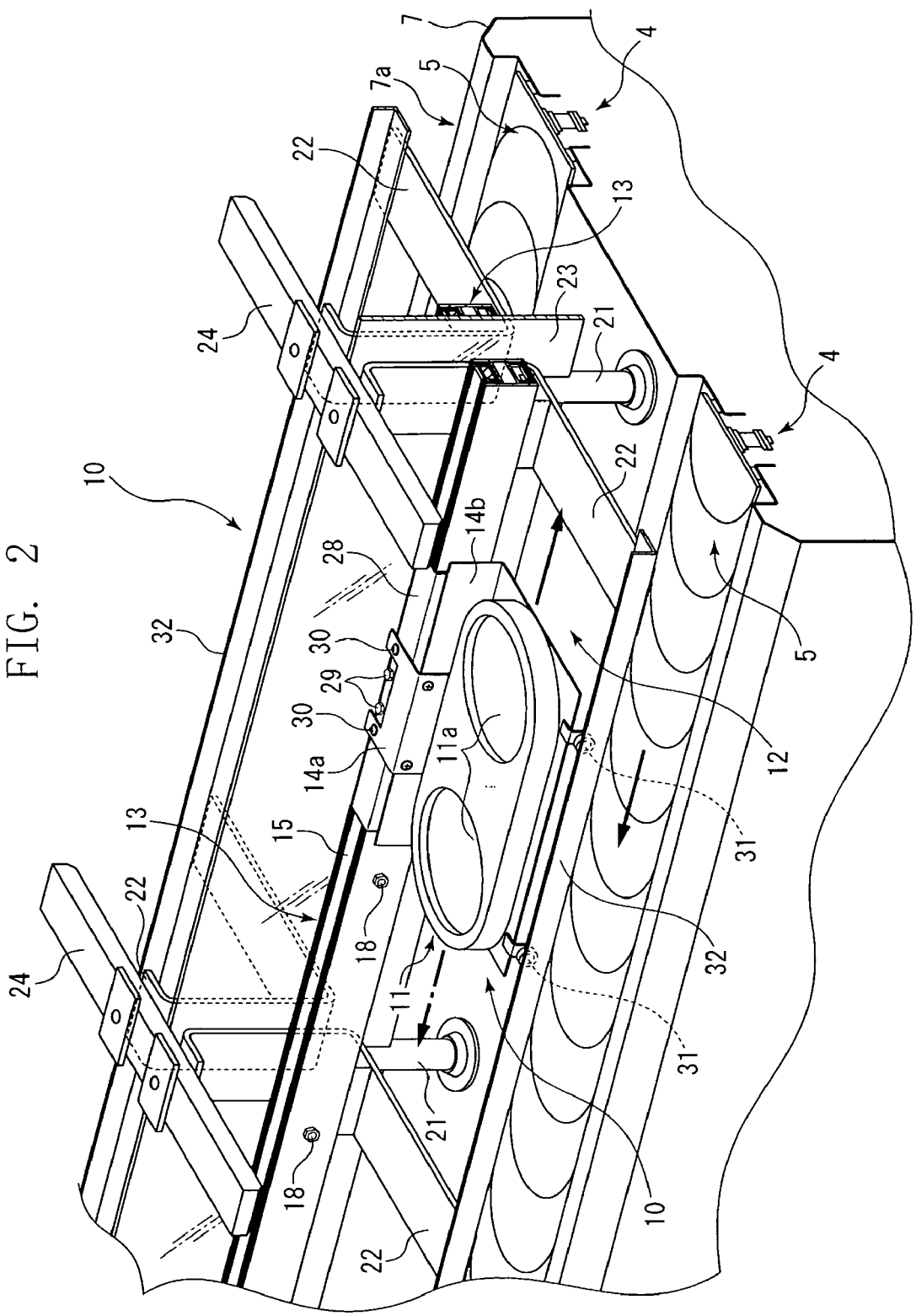
FIG. 2 is a plan diagram showing main portions of the ordered food and drink conveying apparatus and the circular food and drink conveying apparatus according to an embodiment of the present invention.
Figure 3:
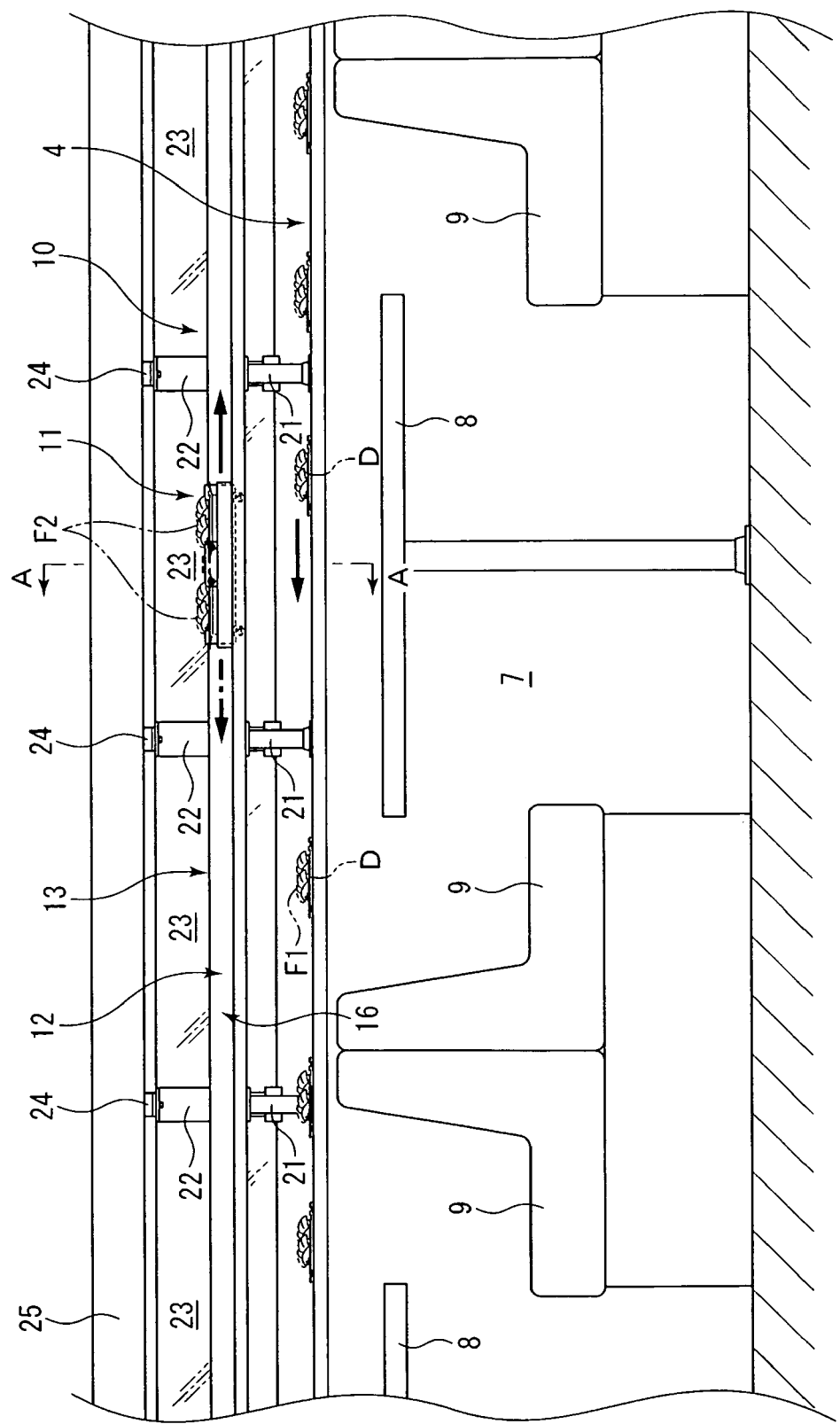
FIG. 3 is a front diagram showing the state of a base as viewed from the customer side.
Figure 4:
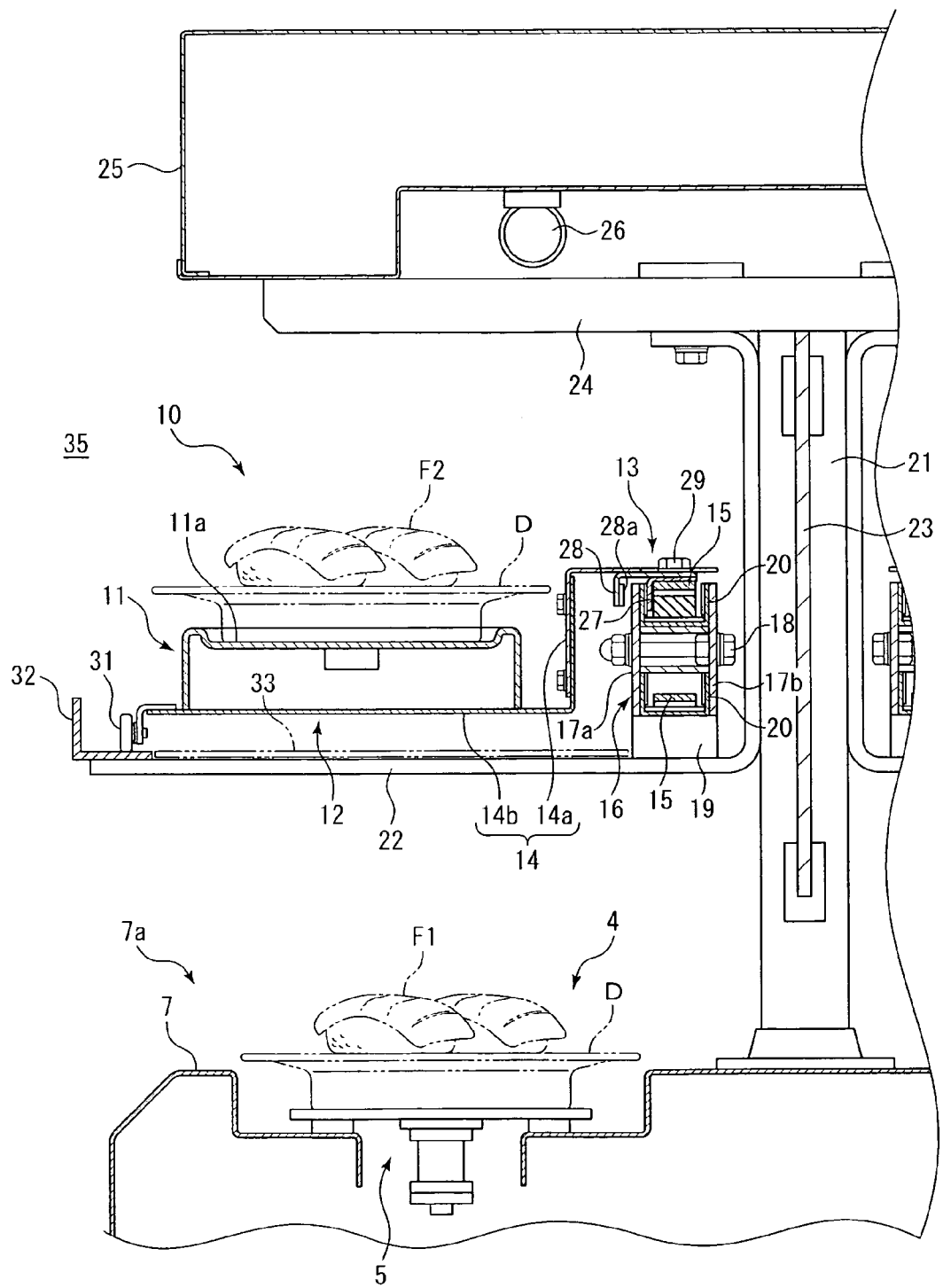
FIG. 4 is a cross sectional diagram along A-A in FIG. 3.

The embodiments of the present invention are described in reference to the drawings. First, FIG. 1 is a plan diagram showing the circular food and drink conveying apparatus according to the present invention. FIG. 2 is a perspective diagram showing main portions of the ordered food and drink conveying apparatus and the circular food and drink conveying apparatus according to the embodiments of the present invention. FIG. 3 is a front diagram showing the state of a base as viewed from the customer side. FIG. 4 is a cross sectional diagram along A-A in FIG. 3.

First, FIG. 1 shows the arrangement of a base 7 provided with the ordered food and drink conveying apparatus 10 and the circular food and drink conveying apparatus 4 according to the embodiments of the present invention within an eating establishment. The inside of the eating establishment is partitioned into a kitchen area 2 and a customer area 3 by a partition 1. The base 7 is formed in approximately E shape in a plan view so that three straight line conveying paths 7a extend into the customer area 3 from the kitchen area 2, a number of tables 8 are provided along the conveying paths around the straight line conveying paths 7a, and customer seats 9 are provided around the tables 8.

An endless crescent chain conveyor 5 (see FIG. 2) where a number of conveying plates in approximately half moon form in a plan view are connected by a chain is provided on the upper surface of the base 7 so as to continuously and freely run through the kitchen area 2 and the customer area 3, and this crescent chain conveyor 5 forms a circular conveying path in approximately E shape in a plan view.

In addition, the ordered food and drink conveying path of the ordered food and drink conveying apparatus 10 according to an embodiment of the present invention is provided above the crescent chain conveyor 5 in the straight line conveying paths 7a. As described in detail, the crescent chain conveyor 5 is bent at the end of a straight line conveying path 7a so that the paths in two directions are provided in parallel in the straight line conveying path 7a, and a pair of ordered food and drink conveying paths formed in a straight line are provided above these paths in two directions, respectively. That is to say, a pair of ordered food and drink conveying paths is provided in each of the three straight line conveying paths 7a.

Mainly within the kitchen area 2, food and drink are placed (supplied) in the circular conveying path of the circular food and drink conveying apparatus 4 and in the ordered food and drink conveying path of the ordered food and drink conveying apparatus 10 so that the food and drink are conveyed along the respective conveying paths so as to be supplied to the customers within the customer area 3. Here, the appropriate food and drink are placed in the circular food and drink conveying apparatus 4, and ordered food and drink F2, which are prepared upon the receipt of an order from the customer in a customer seat 9, is mainly conveyed by means of the ordered food and drink conveying apparatus 10 corresponding to the customer who placed the order.

Next, the structure of the ordered food and drink conveying apparatus 10 is described in detail in reference to FIGS. 2 to 4. Here, though two ordered food and drink conveying apparatuses 10 are provided in a location above the paths in two directions, the structure is the same, and therefore, only one apparatus is described and the detailed description of the other is omitted.

The ordered food and drink conveying apparatus 10 is a conveying apparatus for conveying food and drink when running a conveying tray 11 (see FIG. 2), which is a running body on which a sushi plate D with food and drink, such as sushi (ordered food and drink), is placed and is formed mainly of a conveying tray 11, a driving unit 13, which is a conveyor driving portion provided along the running path 12 along which the conveying tray 11 runs, and a linking member 14 which moves in the direction in which the conveying tray 11 runs when driven by the drive unit 13 as a running body linking portion with one end provided to the drive unit 13 and the other linked to the conveying tray 11.

The drive unit 13 is a conveyor unit formed of a conveying motor, not shown, a drive roller (not shown), which is a driving rotational body linked to the conveying motor, a following roller (not shown), which is a following rotational body not linked to the above described conveying motor, a drive portion that includes at least a conveyor belt 15 (see FIG. 4), which is an annular member crossing around the outer periphery of the drive roller and the following roller, and a casing member 16 to which these drive portions are integrally connected.

As shown in FIG. 3, the casing member 16 is a box with the top opening formed of a pair of side plates 17a and 17b, left and right, extending in the direction of conveyance, linking nuts and bolts for linking these two side plates 17a and 17b, and a support 19 provided beneath the two side plates 17a and 17b. The above described drive roller and following roller are provided so as to be freely rotatable via horizontal axes (not shown) at the two ends between the two side plates 17a and 17b in the longitudinal direction, and a conveyor belt 15 made of a synthetic resin crosses around the outer periphery of the drive roller and the following roller so that the conveyor belt 15 rotates in the longitudinal direction when driven by the conveying motor, not shown.

Belt containing members 20 and 20 in an upward facing C shape in the longitudinal cross section are provided above and beneath the linking nuts and bolts 18 between the two side plates 17a and 17b so as to extend in the longitudinal direction, and the upper and lower portions of the conveyor belt 15 are contained within the upper and lower belt containing members 20 and 20.

As shown in FIGS. 2 and 3, the casing member 16 containing the drive portions, which are integrally connected inside, and extending in the longitudinal direction is provided in a location at a predetermined level above the crescent chain conveyor 5 so as to be directed in the direction of conveyance. Concretely, column supports 21 to which brackets 22 in approximately L shape for supporting the casing member 16 are provided at predetermined intervals so as to be directed in the direction of conveyance between the two paths in different directions in the circular conveying path on the upper surface of the base 7, and the support 19 is placed on the bent portion of the brackets 22 provided at predetermined intervals, and in this state, the support is secured to the brackets with screws, not shown.

A screen plate 23 is provided between the column supports 21 and 21 so that customer seats 9 on the opposite sides are partitioned, and the ordered food and drink conveyed by the ordered food and drink conveying apparatus 10 are prevented from being taken off by mistake by a customer on the opposite side. In addition, lateral frames 24 in the direction perpendicular to the direction of conveyance are provided in the upper portion of the column supports 21, and a shelf 25 on which tableware, such as tea cups and condiments, can be placed and illuminating apparatuses 26 for illuminating the conveying path are provided on and above the lateral frames 24.

The upper end of the linking member 14 made of a metal for linking the conveyor belt 15 and the conveying tray 11 is attached to a portion of the conveyor belt 15 in the longitudinal direction. Concretely, the upper portion of an inner guide plate 27 in approximately L shape in the longitudinal cross section of which a portion slides against the inner surface of the side plate 17a and the upper portion of an outer guide plate 28 in approximately L shape in the longitudinal cross section of which a portion slides against the outer surface of the side plate 17a are attached to the portion of the conveyor belt 15 to which the linking member 14 is attached using bolts 29, and the upper portion of the linking member 14 is secured to the upper surface of this outer guide plate 28 using screws 30. Accordingly, when the conveyor belt 15 rotates, the linking member 14 reciprocates in the longitudinal direction of the casing member 16, that is to say, in the direction in which food and drink are conveyed.

Here, the inner guide plate 27 is provided close to the inner surface of the upper portion of the side plate 17a and the sliding surface 28a of the outer guide plate 28 is provided close to the outer surface of the upper portion of the side plate 17a so that the upper portion of the side plate 17a is sandwiched between the inner guide plate 27 and the outer guide plate 28, and thus, the inclination of the linking member 14 due to the load of the conveying tray 11 is controlled when the inner guide plate 27 and the outer guide plate 28 slide against the side plate 17a.

The linking member 14 is formed of a linking stay 14a, which is secured to the outer guide plate 28, and a tray supporting plate 14b provided so as to be connected to the lower end of the linking stay 14a, and the conveying tray 14 is secured to the upper surface of the tray supporting plate 14b. Front and rear recesses 11a in which sushi plates D can be placed are provided on the upper surface of the conveying tray 11.

In addition, front and rear auxiliary rollers 31 and 31 for supporting the load of the conveying tray 11 and the food and drink placed on the conveying tray 11 are provided at an end of the tray supporting plate 14 on the side opposite to the drive unit 13. The pair of auxiliary rollers 31 and 31, front and rear, can rotate and move along an auxiliary rail 32 which is provided on the front end side of the brackets 22 so as to extend in the direction of conveyance, and thus, supports the load of the conveying tray 11.

As shown in FIGS. 2 and 4, the thus formed drive unit 13, which is a conveyor driving portion, and the conveying tray 11, which is a running body, are provided side by side in the left/right directions relative to the direction in which food and drink are conveyed, that is to say, in the width direction in the running path 12 of the conveying tray 11.

Concretely, as shown in FIG. 4, the drive unit 13 is provided to the brackets 22 on the bent portion side (right side in FIG. 4) and the conveying tray 11 is provided on the customer side (left side in FIG. 4) relative to the drive unit 13. That is to say, the drive unit 13 is provided to the side of the running path 12 along which the conveying tray 11 runs on the side opposite to the side 35 from which ordered food and drink F2 placed on the conveying tray 11 are taken off, and thus, the drive unit 13 is provided on the rear side of the conveying tray 11 as viewed from the customer side, and therefore, the drive unit 13 does not become an obstacle when a customer takes off the ordered food and drink F2, and at the same time, safety increases.

In the thus formed ordered food and drink conveying apparatus 10, the conveying tray 11 basically stands by at the end of the ordered food and drink conveying path (running path 12) in the ordered food and drink conveying apparatus 10 on the kitchen area 2 side. In addition, the food and drink which is ordered by a customer are prepared within the kitchen area 2, the sushi plate D on which the ordered food and drink F2 are placed is placed on the conveying tray 11, and the chef carries out a predetermined conveying operation, and thus, the conveyor belt 15 rotates when driven by the drive unit 13. In addition, the linking member 14 moves along the running path 12 as the conveyor belt 15 rotates, and at the same time, the conveying tray 11 linked to the linking member 14 runs along the running path 12 toward the customer area 3 (direction of solid arrows in FIGS. 2 and 3).

The conveying motor of the drive unit 13 is connected to a control portion, not shown, and as described above, the amount of drive, that is to say, the distance of conveyance is controlled by the controlling portion when the chef carries out a predetermined conveying operation, and therefore, the driving is stopped at the point in time when the conveying tray 11 arrives at the seat 9 of the customer who placed the order, and as a result, the conveying tray 11 stops at the seat 9 of the customer who placed the order (see FIG. 3).

In addition, when a detection sensor, not shown, detects that the customer who placed an order has taken off the food and drink on the conveying tray 11 or a button indicating that the food and drink has been taken off, not shown, is pressed by the customer, the drive unit 13 is again driven so that the conveyor belt 15 rotates in the opposite direction and the empty conveying tray 11 from which the food and drink had been taken off runs in the opposite direction along the running path 12 (direction of one dotted chain line arrows in FIGS. 2 and 3) so as to return to the kitchen area 2. That is to say, the conveying tray 11 is provided so as to freely reciprocate along the running path 12.

As described above, in the ordered food and drink conveying apparatus 10 according to an embodiment of the present invention, the drive unit 13, which is a conveyor driving portion, is driven so that the linking member 14, which is a running body linking portion, moves, and thus, the conveying tray 11, which is a running body, runs, and in addition, no running surface is provided between the conveying tray 11 and the drive unit 13, and thus, the conveying tray 11 is linked to the drive unit 13 without fail via a linking member 14 so that the conveying tray 11 can run stably without using magnetic force or the like, unlike the prior art.

Furthermore, the conveying tray 11 and the drive unit 13 are provided side by side in the width direction of the running path 12, and therefore, it is not necessary to provide a drive unit 13 beneath the running path 12 and the structure of the running path 12 can be simplified, and in addition, food and drink, such as rice grains, placed on the conveying tray 11 can be prevented from dropping into the drive unit 13 and causing a problem with the drive.

In particular, the drive unit 13 is provided to the side opposite to the side 35 from which the food and drink placed on the conveying tray 11 are taken off, that is to say, on the rear side of the running path 12 relative to the conveying tray 11 as viewed from the customer side, and therefore, the drive unit 13 does not become an obstacle when food and drink are taken off, and in addition, safety increases.

In addition, the conveying tray 11 is supported approximately horizontally by the drive unit 13 via a linking member 14, which is a tray linking portion, and a guide member which is formed of an inner guide plate 27 and an outer guide plate 28. That is to say, the load of the conveying tray 11 is supported by the drive unit 13 provided to a side via the linking member 14, and thus, it becomes unnecessary to provide the running path 12 with a running surface for supporting the load of the conveying tray 11 so that the conveying tray can run, and therefore, the structure of the running path 12 is simplified.

In addition, though in the present embodiment the auxiliary rail 32 makes the running surface of the conveying tray 11 a portion of the running path 12, as indicated by the two dotted chain line in FIG. 4, for example, a drop preventing plate 33 which prevents food and drink from dropping may be provided beneath the running path 12 so as to cross a number of brackets 22, and by doing so, food and drink can be prevented from dropping onto food and drink F1 moving on the circular conveying path of the circular food and drink conveying apparatus 4 below or onto the circular conveying path. Here, this drop preventing plate 33 can be formed of a transparent acryl plate or the like so that an uncomfortable experience can be prevented from being felt by the customer.

In addition, the drive unit is formed of drive portions which include a drive roller which rotates by means of a drive motor or the like, not shown, a following roller, and a conveyor belt 15 which goes around the drive roller and the following roller and to which the linking member 14 is attached, and a case member 16 to which the drive portions are combined integrally, and thus, the drive portions are combined with the case member 16, and therefore, the drive unit 13 can be simply placed on each bracket 22, and thus, easily placed to a side of the running path 12. In addition, an ordered food and drink conveying apparatus 10 can be simply provided at a later time to the base 7 where only the circular food and drink conveying apparatus 4 is provided in advance.

In addition, the running path 12 (ordered food and drink conveying path) for the ordered food and drink conveying apparatus 10 is provided along the circular food and drink conveying path above the crescent chain conveyor 5 (circular food and drink conveying path) for the circular food and drink conveying apparatus 4, and therefore, food and drink can be efficiently conveyed using both the circular food and drink conveying apparatus 4 and the ordered food and drink conveying apparatus 10, and in addition, the ordered food and drink F2 can be prevented from being taken by mistake by a customer who did not place the order and supplied without fail to the customer who placed the order. In addition, the circular food and drink conveying path and the ordered food and drink conveying path can be provided one above the other with the space being used efficiently.

Here, in the present embodiment, auxiliary rollers 31 are provided to the conveyance tray 11 so that the conveyance tray 11 is supported by the auxiliary rail 32 on the side opposite to the drive unit 13, and thus, the two sides of the conveyance tray 11 are supported, one by the drive unit 13 and the other by the auxiliary rail 32, and therefore, the conveyance tray 11 is held in an approximately horizontal position with high stability. However, the present invention is not limited to this, and the conveyance tray 11 may be supported only by the drive unit 13 with the linking member 14 in between in such a state that the load is held by one side without providing auxiliary rollers 31 or an auxiliary rail 32, and by doing this, the length of the bracket 22 can be made shorter, thus preventing the structure from protruding into the running path 12, and therefore, an uncomfortable experience can be prevented from being felt by the customer.

Figure 5:
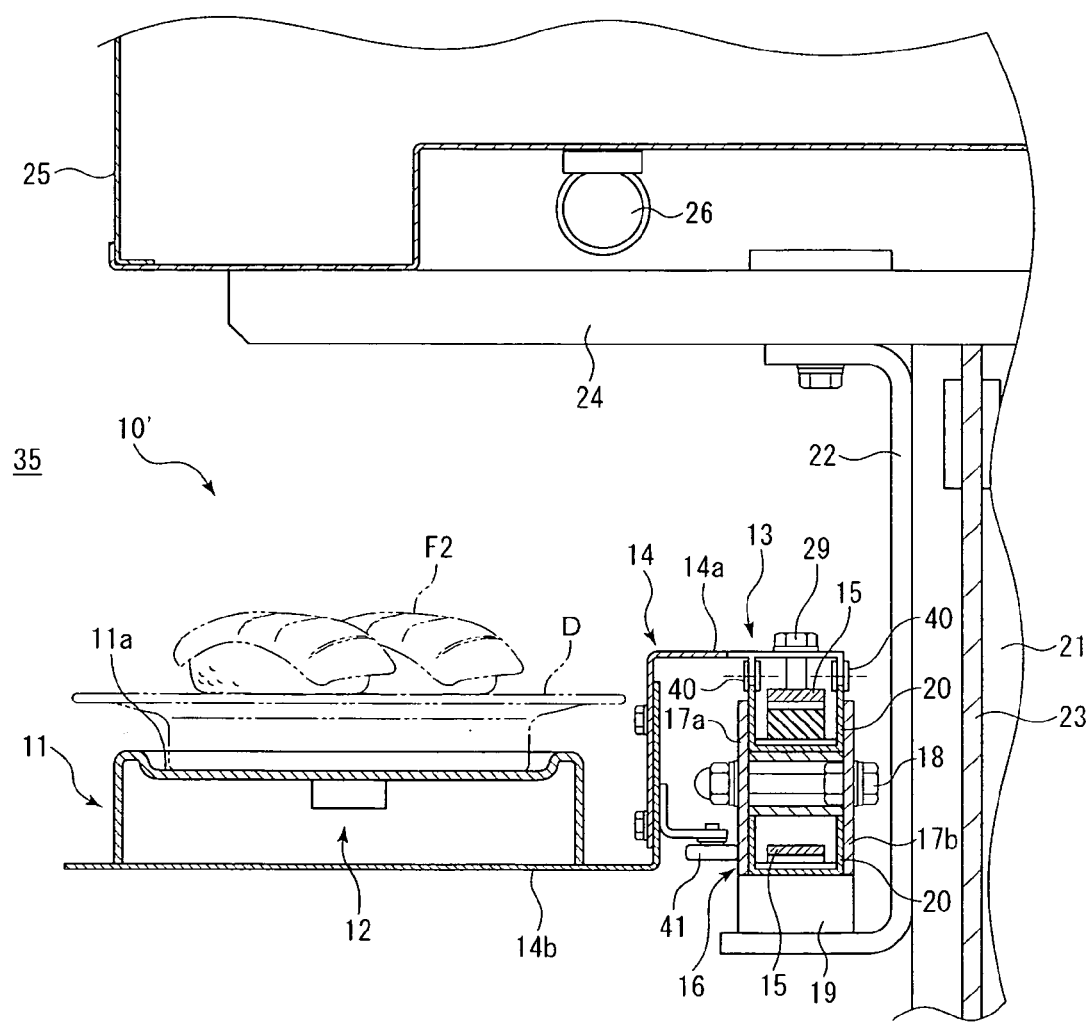
FIG. 5 is a longitudinal cross sectional diagram showing the ordered food and drink conveying apparatus according to Modification 1.
Figure 6:
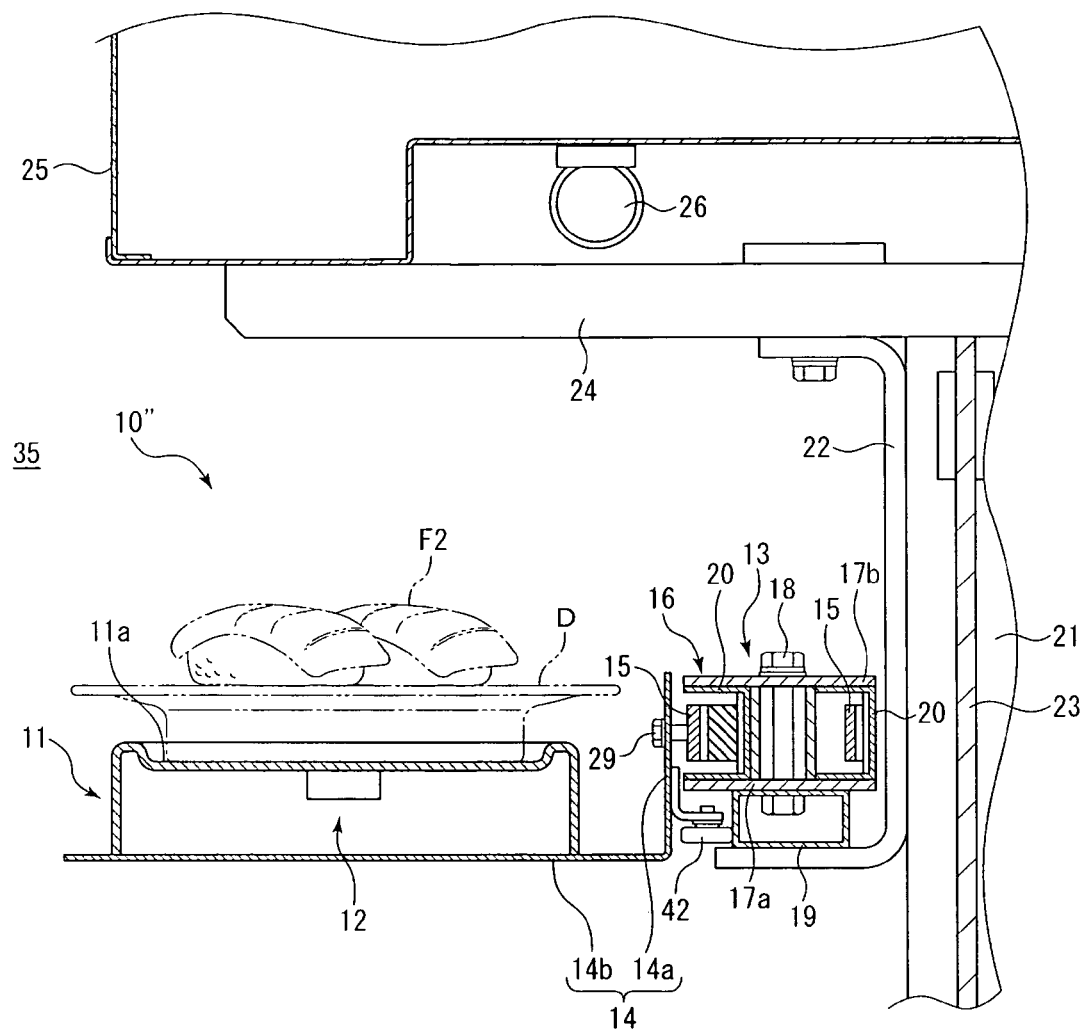
FIG. 6 is a longitudinal cross sectional diagram showing the ordered food and drink conveying apparatus according to Modification 2.

An example of this is described in reference to FIGS. 5 and 6, which show ordered food and drink conveying apparatuses 10' and 10", according to the modifications of the embodiment. FIG. 5 is a longitudinal cross sectional diagram showing the ordered food and drink conveying apparatus according to Modification 1. Likewise, FIG. 6 is a longitudinal cross sectional diagram showing the ordered food and drink conveying apparatus according to Modification 2.

In the ordered food and drink conveying apparatus 10' according to Modification 1 shown in FIG. 5, the conveyance tray is supported only by the drive unit 13 in such a state that it is held by one side. The upper end of the upper belt containing member 20 in C shape in the longitudinal cross section facing upwards in the drive unit 13 protrudes above the side plates 17a and 17b. A first guide roller 40 guided by the upper end of the protruding belt containing member 20 is provided in the linking stay 14a of the linking member 14, and at the same time, a second guide roller 41 which makes contact with and rotates on the lower portion of the outer surface of the side plate 17a is provided on the tray supporting plate 14b.

Thus, the linking member 14 is guided by two guide rollers 40 and 41 along the upper portion and the lower portion of the drive unit 13, and therefore, the load of the conveyance tray 11 provided to the side can be fully supported, and thus, the length of the bracket 22 can be made shorter as shown in the figure.

Likewise, in the ordered food and drink conveying apparatus 10" according to Modification 2 shown in FIG. 6, the conveyance tray 11 is supported only by the drive unit 13 in such a state that it is held by one side. The linking member 14 is provided with a guide roller 42, which makes contact with a side of the support 19. In addition, in the drive unit 13 according to the present modification, the upper portion of the support 19 is provided laterally. That is to say, a drive roller and a following roller, not shown, are provided around a vertical axis so as to be freely rotatable so that the conveyor belt 15 runs laterally.

By doing this as well, the conveyance tray 11 in a supported state can run in the same manner as in the first embodiment and Modification 1. In addition, the drive unit 13 can be formed so as to curve in a lateral direction when the conveyor belt 15 runs laterally, and therefore, it becomes possible to form a running path 12 having a curved path without the running path 12 being limited to being in a straight line.

In addition, in the present embodiment, the auxiliary rail 32 is provided on the side 35 from which food and drink can be taken off from the running path 12 so as to extend along the running path 12, and thus, customers can be prevented from putting their hands or head unknowingly into the running path 12 having no running surface so that the risk of contact between the conveyance tray 11 running along the running path 12 and a customer can be avoided. That is to say, the auxiliary rail 32 forms an entrance prohibiting means according to the present invention.

In particular, this entrance prohibiting means is formed of the auxiliary rail 32 for supporting the conveyance tray 11 stably, and therefore, it is not necessary to separately provide this entrance prohibiting means, and thus, the manufacturing cost can be effectively reduced.

Figure 7:
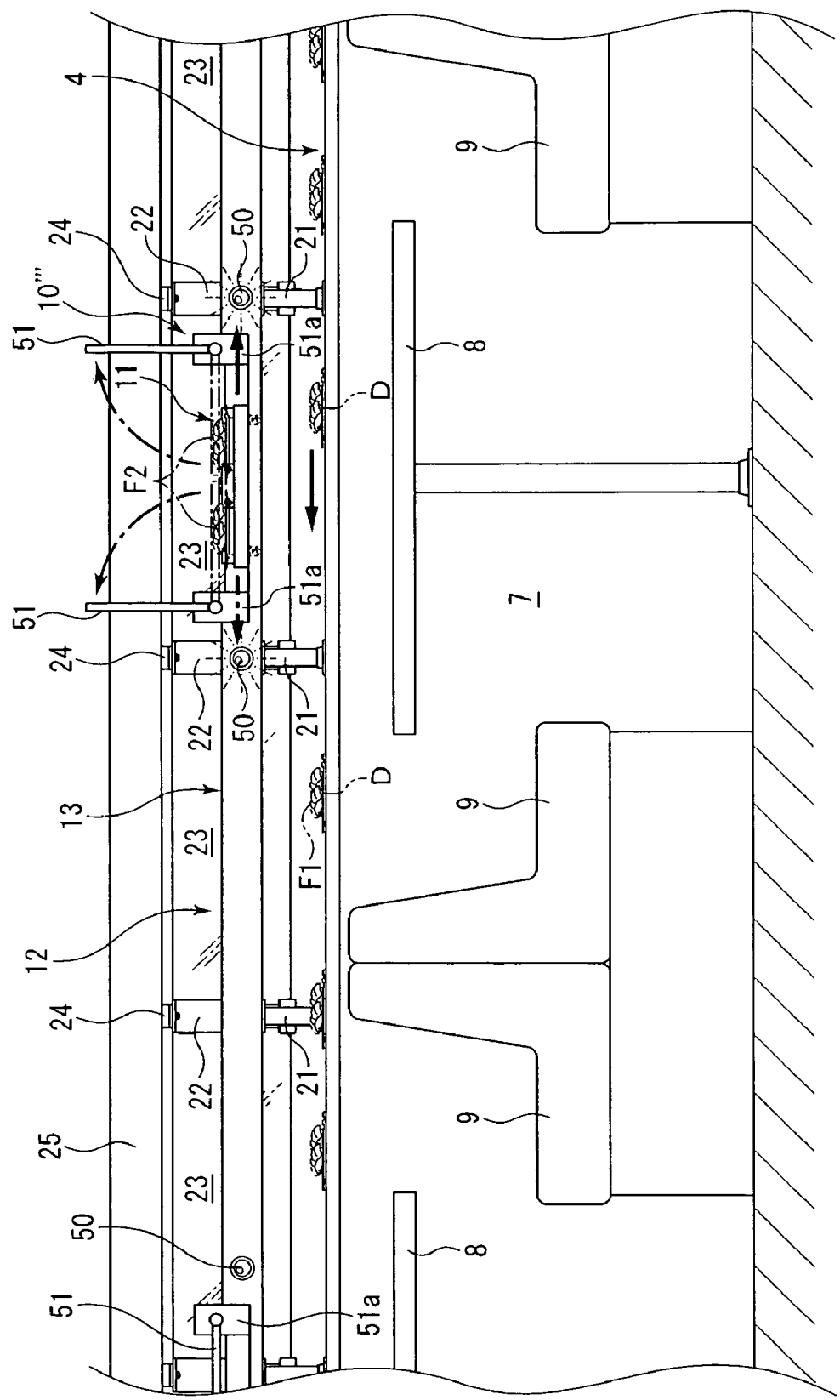
FIG. 7 is a front diagram showing the ordered food and drink conveying apparatus according to Modification 3.

In addition, as shown in FIG. 7, the side plate 32a of the auxiliary rail 32 on the customer side can be made high so that the conveyance tray 11 is covered so as not to be seen from the customer 9 side, and thus, ordered food and drink F2 can be prevented from being taken off by mistake by a customer who did not place the order. In this case, notches 32b may be created in the side plate 32a of the auxiliary rail 32 corresponding to the customer seats 9 so that ordered food and drink F2 can be easily taken off, and at the same time, pairs of opening and closing bars 51, which can open and close the notches 32b, may be provided so that the opening and closing bars 51 jump upwards to open the notches when the drive portion 51a for supporting the opening and closing bars 51, which are thus freely rotatable, is operated in response to a conveyance tray 11 when stopping at the notch 32b corresponding to the customer who placed the order.

Here, the side plate 32a and the opening and closing bars 51 of this auxiliary rail 32 also form a portion of the entrance prohibiting means according to the present invention.

In addition, the conveyance tray 11 is not always conveyed along the conveyance path as in the circular food and drink conveying apparatus 4, and the conveyance tray 11 runs on the running path 12 only when ordered food and drink F2 is supplied to a customer, and therefore, there is a risk of customers putting their hands or head into the running path unknowingly as described above. Accordingly, a number of report lamps 50 for reporting that a conveyance tray 11 is coming may be provided on the outer surface of the side plate 32a of the auxiliary rail 32 so as to correspond to the customer seat 9 and face the direction in which the conveyance tray 11 runs, as in the ordered food and drink conveying apparatus 10''' according to Modification 3 shown in FIG. 7, for example, in order to draw attention from the customers.

Concretely, the report lamps 50 may be turned on and off in sequence starting from the upstream side in the direction in which a conveyance tray 11 runs on the basis of the conveyance operation by a chef as described above (running light), or the report lamp 50 corresponding to the customer seat 9 to which a conveyance tray 11 approaches may be turned on and off. The arrangement of these report lamps 50 and the manner in which they turn on and off are not limited to the above description, and various modifications are possible.

Furthermore, speakers or alarm buzzers which can emit a sound may be provided instead of or in addition to the report lamps 50 so that customers can be notified of an approaching conveyance tray, and thus, a risk of contact between the conveyance tray 11 coming along the running path 12 and a customer can be avoided.

In addition, these report lamps 50 or speakers form the reporting means according to the present invention, which is not limited to light-emitting lamps or speakers, and an approaching conveyance tray 11 may be reported using display screens of apparatuses for ordering food and drink (not shown), which are provided for the respective customer seats 9 and used when customers place an order for food and drink, for example.

In addition, the reporting means according to the present invention may be any means for reporting to customers whether or not a conveyance tray 11 is running, for example, a conveyance tray 11 is an idle state in the kitchen area 2 or it is passing by another customer seat 9 in addition to an approaching conveyance tray 11.

Though the embodiments of the present invention are described in reference to the drawings, the concrete configurations are not limited to these embodiments, and modifications and additions within the scope from which the gist of the present invention is not deviated are included in the present invention.

For example, though the above described ordered food and drink conveying apparatus 10 according to the embodiment is provided above the circular conveyance path in the circular food and drink conveying apparatus 4, it may be provided beneath or to a side of the circular food and drink conveying apparatus 4, or it may be independently provided in a location away from the circular food and drink conveying apparatus 4.

In addition, though the above described ordered food and drink conveying apparatus 10 according to the embodiment is provided within the customer area 3 so that the ordered food and drink F2 that has been conveyed can be supplied to the customer, it is not necessarily limited to an apparatus for conveying ordered food and drink F2 and may be used as a conveyance apparatus for supplying food and drink to a chef who is away from the customer area, for example.

In addition, though the above described drive unit 13, which is a conveyor driving portion according to the embodiment, is a belt conveyor formed of a conveyance motor, a drive roller, a following roller and a conveyor belt, it can be modified in various manners as long as it is a conveyor driving portion which can move linking members, such as a chain conveyor made up of a conveyance motor, a drive sprocket, a following sprocket and a conveyor chain, in the direction of conveyance.

In addition, though in the above described embodiments, the running path 12 along which conveyance trays 11 run is formed of only the upper surface of the auxiliary rail 32 on which the auxiliary rollers 31 rotate, that is to say, a running surface is formed as a portion of the running path 12, the running path may not have a running surface at all as in the ordered food and drink conveying apparatuses 10' and 10'' according to Modifications 1 and 2 shown in FIGS. 5 and 6, or a running surface may be formed so that conveyance trays 11 can freely run on the running surface with rollers in between.

In addition, though the conveyance tray 11 and the drive unit 13 are provided in parallel approximately horizontally in the above described embodiments, the drive unit 13 may be provided on at least one side, left or right, in the direction of conveyance along the running path 12, and thus, it may be provided on the two sides, left and right, or only on the side from which food and drink can be taken off.

Furthermore, the height of the unit is not limited to approximately the same height as the conveyance tray 11 as long as the unit is provided to a side of the running path 12, and the unit may be provided above or below the conveyance tray 11.

In addition, though food and drinks F1 and F2 placed on sushi plates D are sushi in the above described embodiments, the present invention is not limited to these, and food and drinks to be placed on sushi dishes D may be other food and drinks, such as juice, beer, cooked food in a bowl, and pickles. Furthermore, though the running body is formed as a tray, the form can be modified in various manners as long as food and drink can be placed on top of it.

The invention claimed is:

1. A conveying apparatus for conveying food and drink by running a running body on which food and drink is placed, comprising:
   a conveyor driving portion provided along a running path along which said running body runs; and
   a running body linking portion linked to said running body that moves in a direction in which said running body runs when driven by said conveyor driving portion, wherein
   said conveyor driving portion is provided on a side of said running path, and
   said conveyor driving portion comprises: a driving rotational body which rotates by means of a drive source; a following rotational body provided separately from the driving rotational body; a driving part comprising an annular member which crosses said driving rotational body and said following rotational body and to which said running body linking portion is attached; and a casing member to which the driving part is integrally connected.

2. The conveying apparatus according to claim 1, wherein said conveyor driving portion is provided on the side of said running path that is opposite to a customer side of said running path from which food and drink on said running body are removed by customers.

3. The conveying apparatus according to claim 1, wherein said running body is supported approximately horizontally by said conveyor driving portion via said running body linking portion.

4. The conveying apparatus according to claim 1, further comprising: a circular food and drink conveying apparatus for supplying food and drink to customers by continuously conveying an endless circular conveying path, wherein
   said running path is positioned above said circular conveying path.

5. The conveying apparatus according to claim 1, further comprising an entrance prohibiting means for prohibiting entrance into said running path on a customer side of said running path from which food and drink on said running body are removed by customers.

6. The conveying apparatus according to claim 5, wherein said entrance prohibiting means is a support rail for supporting a side of said running body which extends in a longitudinal direction of said running path.

7. The conveying apparatus according to claim 1, further comprising a reporting means for reporting a running state of said running body.

8. The conveying apparatus according to claim 2, wherein said running body is supported approximately horizontally by said conveyor driving portion via said running body linking portion.

9. The conveying apparatus according to claim 2, further comprising: a circular food and drink conveying apparatus for supplying food and drink to customers by continuously conveying an endless circular conveying path, wherein
   said running path is positioned above said circular conveying path.

10. The conveying apparatus according to claim 3, further comprising: a circular food and drink conveying apparatus for supplying food and drink to customers by continuously conveying an endless circular conveying path, wherein
    said running path is positioned above said circular conveying path.

11. The conveying apparatus according to claim 2, further comprising an entrance prohibiting means for prohibiting entrance into said running path on a customer side of said running path from which food and drink on said running body are removed by customers.

12. The conveying apparatus according to claim 3, further comprising an entrance prohibiting means for prohibiting entrance into said running path on a customer side of said running path from which food and drink on said running body are removed by customers.

13. The conveying apparatus according to claim 4, further comprising a reporting means for reporting a running state of said running body.

14. The conveying apparatus according to claim 5, further comprising a reporting means for reporting a running state of said running body.

15. A conveying apparatus for conveying food and drink by running a running body on which food and drink is placed, comprising:
    a conveyor driving portion provided along a running path along which said running body runs;

a running body linking portion linked to said running body that moves in a direction in which said running body runs when driven by said conveyor driving portion;

a circular food and drink conveying apparatus for supplying food and drink to customers by continuously conveying an endless circular conveying path, wherein said running path is positioned above said circular conveying path;

an entrance prohibiting means for prohibiting entrance into said running path on a customer side of said running path from which food and drink on said running body are removed by customers, said entrance prohibiting means comprising a support rail for supporting a side of said running body which extends in a longitudinal direction of said running path; and a reporting means for reporting a running state of said running body, wherein said conveyor driving portion is provided on the side of said running path that is opposite to said customer side of said running path, said running body is supported approximately horizontally by said conveyor driving portion via said running body linking portion, and said conveyor driving portion comprises: a driving rotational body which rotates by means of a drive source; a following rotational body provided separately from the driving rotational body; a driving part comprising an annular member which crosses said driving rotational body and said following rotational body and to which said running body linking portion is attached; and a casing member to which the driving part is integrally connected.

* * * * *